(No Model.)

F. L. LANGE.
COVER FOR VELOCIPEDE WHEEL TIRES.

No. 467,742. Patented Jan. 26, 1892.

WITNESSES
S. J. Clark
W. H. James.

INVENTOR
Frederick L. Lange.
Per Robt. S. d. Phillips
ATTORNEY

UNITED STATES PATENT OFFICE.

FREDERICK LOUIS LANGE, OF OXFORD, ENGLAND.

COVER FOR VELOCIPEDE-WHEEL TIRES.

SPECIFICATION forming part of Letters Patent No. 467,742, dated January 26, 1892.

Application filed June 9, 1891. Serial No. 395,717. (No model.)

*To all whom it may concern:*

Be it known that I, FREDERICK LOUIS LANGE, a subject of the Queen of Great Britain, residing at Oxford, in the county of Oxford, England, have invented a new and useful Improvement in Covers for Tires for the Wheels of Velocipedes and like Vehicles, of which the following is a specification.

My invention relates to elastic tires having hollow interior spaces within them for the purpose of increasing the resilient action of the rubber; and it consists of a cover having longitudinal ribs on its exterior surface adapted to be placed over the rubber tire, the object being to prevent side slipping of the wheel, which is an inherent defect of this type of tire, owing to the broad surface it presents to the road under the load carried by the wheel.

Figure 1:
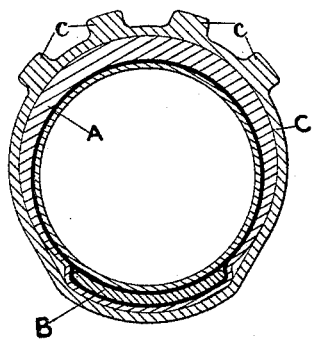
Figure 2:
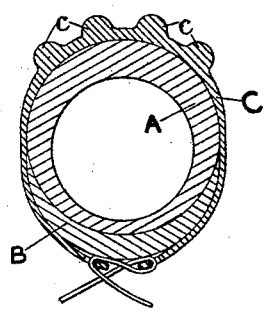
Figure 3:
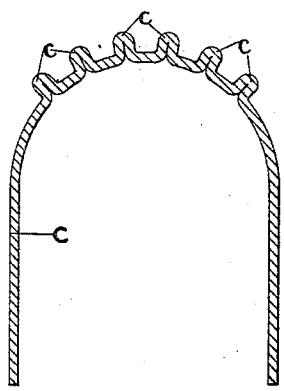
Figure 4:
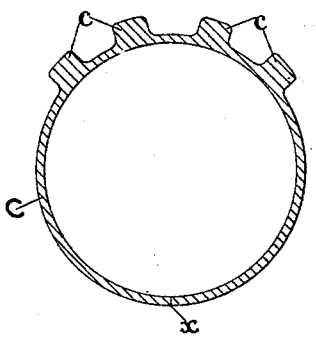
Figure 5:
Figure 6:
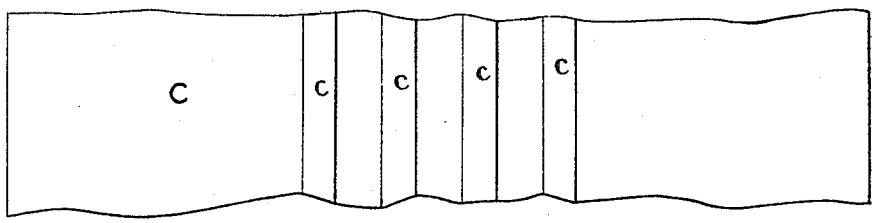

In the drawings which serve to illustrate my invention, Figure 1 is a view in cross-section of a pneumatic or inflated tire fitted with my improved cover. Fig. 2 is a view in cross-section of a cushion or tubular tire fitted with my improved cover. Fig. 3 is a view in cross-section showing another form my invention may assume. Fig. 4 is a view in cross-section of my improved cover, illustrating one method of constructing it; and Figs. 5 and 6 are views in cross-section and broken plan, respectively, of my improved cover, illustrating another method of constructing it.

Throughout the several views similar parts are marked with like letters of reference.

Referring to Figs. 1 and 2 of the accompanying drawings, A designates the ordinary pneumatic or cushion tire fixed to the rim of the wheel B and generally constructed, arranged, and operating in the manner already well known. Over the tire A is placed a flexible cover C, having at or about its center two, three, or more continuous longitudinal ribs or projections c. This cover C may be attached either by cementing its edges together and to the inner side of the rim B, as shown by Fig. 1, or by lacing its edges together under the rim B, as shown by Fig. 2.

The cover C may be made of rubber or leather, or of a combination of both, or either or both combined with canvas. The construction which I prefer to adopt is that illustrated by Figs. 1 and 2, in which the cover is made of a thin sheet of soft rubber with a canvas backing, with the ribs or projections made of a good hard wearing compound of rubber.

To construct my cover I prefer to form it in the shape of a tube, as shown by Fig. 4, and split it longitudinally at the point marked *x* to enable it to be placed round the tire; but it may equally as well be molded in the form shown by Figs. 5 and 6. When the cover is made of leather, I prefer to form the ribs or projections by making longitudinal folds, as shown by Fig. 3.

With a cover of this construction all liability of the wheel to slip sidewise is overcome, as the ribs provide distinct running surfaces, two or more of which are always in contact with the surface of the road whatever the inclination of the wheel may be.

It will be seen that the cover can easily be removed or attached, and that it does not in any way interfere with the tire it is covering, but that, on the other hand, with pneumatic or inflated tires it gives increased protection to the inflation-tube from puncturing.

The cover is adapted to be fitted over the tire and the felly or rim of the wheel in wet weather and to be taken off when the weather is dry and when there is no tendency of the tire to slip.

I am aware that it is not new to form projections or corrugations on the bearing-surfaces of rubber tires, and I therefore do not broadly claim such as my invention; but,

Having now fully described my invention, what I claim, and desire to secure by Letters Patent, is—

The combination, with the felly and the tire secured to it and adapted for ordinary use, of a removable cover of flexible material provided with ribs, and means, such as a lace, for securing together the edges of the cover under the said felly, whereby the said felly and tire are wholly inclosed by and rigidly secured to the said temporary cover and the wheel is prevented from slipping, substantially as set forth.

FREDERICK LOUIS LANGE.

Witnesses:
CHARLES BAGE,
   2 *Norham Gardens, Oxford.*
RICHD. CLARIDGE,
14 *Walton St., Oxford, Clerk to Thos. M. Davenport, Notary Public, Oxford.*